United States Patent
Janson

(10) Patent No.: US 7,226,251 B2
(45) Date of Patent: Jun. 5, 2007

(54) DRILLING DEVICE AND DRILLING METHOD USED WITH SUCH A DEVICE

(75) Inventor: Jean-Philippe Janson, Le Hamel (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/132,407

(22) Filed: May 19, 2005

(65) Prior Publication Data

US 2005/0286983 A1   Dec. 29, 2005

(30) Foreign Application Priority Data

May 26, 2004   (FR) .................................. 04 51030

(51) Int. Cl.
*B23B 35/00* (2006.01)
*B23Q 11/10* (2006.01)

(52) U.S. Cl. ........................... 408/1 R; 408/56; 408/67

(58) Field of Classification Search ................ 408/1 R, 408/56, 61, 67; 409/137, 131–132, 136
See application file for complete search history.

(56) References Cited

U.S. PATENT DOCUMENTS

| | | | | |
|---|---|---|---|---|
| 4,037,982 A * | 7/1977 | Clement | ...................... | 408/61 |
| 4,205,728 A * | 6/1980 | Gloor et al. | ................. | 175/209 |
| 4,563,115 A * | 1/1986 | Abe et al. | ................... | 409/134 |
| 4,915,550 A * | 4/1990 | Arai et al. | .................... | 408/56 |
| 5,024,562 A * | 6/1991 | Arai et al. | ................... | 408/1 R |
| 5,113,951 A * | 5/1992 | Houben et al. | ................ | 173/75 |
| 5,129,467 A * | 7/1992 | Watanabe et al. | .............. | 173/75 |
| 5,332,341 A * | 7/1994 | Arai et al. | .................... | 408/61 |
| 5,356,245 A * | 10/1994 | Hosoi et al. | .................. | 408/56 |
| 5,779,402 A * | 7/1998 | Kameda | ....................... | 408/56 |
| 5,791,842 A * | 8/1998 | Sugata | ........................ | 409/137 |
| 6,394,940 B1* | 5/2002 | Sugata et al. | ................. | 483/13 |
| 2002/0141836 A1* | 10/2002 | Ege et al. | ...................... | 408/67 |
| 2004/0208715 A1* | 10/2004 | Arich | ........................... | 408/67 |
| 2005/0089380 A1* | 4/2005 | Stoerig | ........................ | 408/67 |

FOREIGN PATENT DOCUMENTS

| | | |
|---|---|---|
| DE | 196 51 662 A1 | 6/1998 |
| EP | 1 430 994 A1 | 6/2004 |
| JP | 57173438 A * | 10/1982 |

* cited by examiner

*Primary Examiner*—Erica Cadugan
(74) *Attorney, Agent, or Firm*—Oblon, Spivak, McClelland, Maier & Neustadt, P.C.

(57) ABSTRACT

A method for using a drilling device with a rotating tool, a drilling machine and lubrication device. The device includes an intermediate chamber for storage of chips produced during an elementary drilling operation, and a scavenging device capable of generating an airflow scavenging the chips. The elementary drilling operation is performed without activating the scavenging device, and the elementary drilling operation is followed by an airflow scavenging operation of the chips stored in the intermediate storage chamber during the elementary drilling operation.

10 Claims, 2 Drawing Sheets

DRILLING DEVICE AND DRILLING METHOD USED WITH SUCH A DEVICE

TECHNICAL DOMAIN

This invention relates in general to the drilling field including drilling techniques, drilling-countersinking techniques and any other similar technique using a drilling machine combined with a rotating tool such as a drill bit.

More precisely, the invention relates to semi-automated and automated drilling devices capable of performing such techniques, and drilling methods done using these devices.

STATE OF PRIOR ART

In a manner known to those skilled in the art, the quality of the result obtained with such drilling devices depends on various parameters, obviously including good lubrication of the rotating tool.

Furthermore, it is highly desirable to obtain the lowest possible lubricant residue inside the hole that has just been drilled. The small lubricant residue prevents chip particles from sticking on the machined surface, and also prevents this machined surface from being polluted with a lubricant that can harm applications and/or functions of the drilled part, this case being encountered particularly when the lubricant has anti-bond properties.

Furthermore, the quality of the result obtained also depends on good evacuation of chips produced during drilling. If this evacuation is not efficient and some chips remain in place, these chips may then be entrained in rotation with the rotating tool and consequently scratch the hole produced and its immediate surroundings.

In conventional drilling devices according to prior art, it is normally planned that chips will be drawn in by suction during each elementary drilling operation, which assures satisfactory evacuation of the chips.

Although airflow scavenging may be satisfactory in terms of removal of chips, it has the undesirable effect that at the same time it draws in the lubricant, obviously with the direct consequence of deteriorating the global quality of the hole produced, and possibly damaging the drill bit used.

In this respect, note that this disadvantage of drawing in lubricant can be avoided by injecting lubricant at high pressure. However, this high pressure injection technique naturally increases the required quantity of lubricant and increases energy consumption due to the high pressure applied.

Furthermore, note that the fact that the tool is lubricated at high pressure usually introduces the appearance of a non-negligible lubricant residue inside the drilled hole, which generates the disadvantages mentioned above related to sticking of chip particles and pollution of the machined surface of the hole obtained.

OBJECT OF THE INVENTION

Therefore, the purpose of the invention is to propose a drilling device and a drilling method done using such a device, this device and this process at least partially overcoming the disadvantages mentioned above related to products made according to prior art.

More precisely, the purpose of the invention is to present a drilling device and a drilling method assuring satisfactory evacuation of chips while maintaining good lubrication of the tool, but without this lubrication necessarily being made at high pressure.

To achieve this, the first object of the invention is a drilling device with a rotating tool comprising a drilling machine capable of turning the tool in rotation, and lubrication means capable of lubricating the rotating tool. According to the invention, the device also comprises:
an intermediate chamber for storage of chips produced during an elementary drilling operation;
introduction means, for introducing chips into the intermediate storage chamber during the elementary drilling operation, these introduction means being designed so as to operate other than by generating an airflow;
a main chip storage chamber communicating with the intermediate storage chamber; and
scavenging means, capable of generating an airflow scavenging chips present in the intermediate storage chamber, towards the main storage chamber.

Another object of the invention is a drilling method done using such a drilling device, the method including an elementary drilling operation performed using the rotating tool and the drilling machine, and a lubrication operation of the rotating tool made using lubrication means, the lubrication operation being implemented during the elementary drilling operation. According to the invention, the elementary drilling operation is followed by a step to use an airflow to scavenge chips that were introduced into the intermediate storage chamber during this elementary drilling operation and through the introduction means, the scavenging operation being used such that the chips are swept towards the main storage chamber.

Thus, it should be understood that the general principle of the invention lies firstly in the fact that the chips are pre-stored in an intermediate chamber during an elementary drilling operation using introduction means not using an airflow and consequently not drawing in the lubricant, and secondly in the fact that this intermediate chamber is emptied by suction and/or blowing when the elementary drilling operation has been completed.

In this manner, chips are expressly evacuated by an airflow in a way so that it cannot disturb the lubrication that is not done at the same time, therefore advantageously reducing the risk of obtaining holes outside tolerances.

In this respect, note that the fact that lubrication periods and chip scavenging by airflow periods make it possible to inject the lubricant at low pressure, which is advantageous in terms of cost and quality of the surface condition of the drilled hole. Low pressure injection provides a means of obtaining an extremely low lubricant residue in the hole made, thus limiting the bond effect of chip particles on the machined surface, and pollution of this surface.

Furthermore, still due to the possibility of injecting lubricant at low pressure, the quantity of lubricant necessary to perform each elementary drilling operation is significantly lower than was the case in prior art.

It should be also understood that when several elementary drilling operations are carried out, the use of an airflow to scavenge chips from the intermediate storage chamber towards the main chamber only takes place between two directly consecutive elementary operations. Consequently, there is advantageously a reduction in noise and energy consumption related to evacuation of the chips produced.

Preferably, the drilling device is such that the introduction means are composed of an adapted shape of the rotating tool, which automatically drives the chips produced towards the intermediate storage chamber close to this tool. In other words, chips are guided and ejected in a determined manner solely due to the shape of the drill bit, such that these chips are automatically inserted inside the intermediate chamber without the need for any additional means.

Preferably, the rotating tool is provided with helical flutes so that an <<Archimedes screws>> type effect can be obtained. Thus, this effect is easily obtained by providing long and deep flutes, while making the chips rise along the length of the drill bit in a direction opposite to a drilling direction, until these chips are ejected at the end of the flutes, corresponding to a junction area between a fluted part and a central part of the drill bit.

In this manner, all that is necessary is to judiciously position the intermediate storage chamber with respect to the drill bit, such that the chips can directly and automatically penetrate inside this chamber after having been ejected from the same drill bit. In this respect, it is then preferable if there is a junction area between the central parts and the flutes inside this intermediate storage chamber throughout the elementary drilling operation. Furthermore, to facilitate the introduction of chips into the intermediate storage chamber, the fluted part is preferably arranged such that its free end is oriented upwards, this free end then being located above the intermediate storage chamber, also throughout the elementary drilling operation.

Still preferably, the scavenging means comprise suction means and blowing means. Naturally, it would also have been possible to have an arrangement such that these scavenging means include only suction means, or only blowing means, without going outside the scope of the invention.

The suction means are preferably in the form of a Venturi effect suction system, this system communicating naturally with the intermediate chip storage chamber. Nevertheless, note that other solutions are naturally possible, such as the use of an electric vacuum cleaner associated with a sequencing valve, the sequencing valve being provided so as to achieve a sequential suction necessary when the automated or semi-automated device is designed to perform several elementary drilling operations consecutively.

Note for information that unlike an automated device, the semi-automated device requires action by an operator between two elementary drilling operations.

Also in the case in which the suction means are in the form of a Venturi effect suction system, the suction system may advantageously include the main chip storage chamber, and possibly act as a filter. Furthermore, these suction means are coupled to a pneumatic solenoid valve for producing the required sequential suction.

Preferably, the blowing means are in the form of a compressed air supply, also communicating with the intermediate chip storage chamber.

Furthermore, the lubrication means are advantageously designed so as to enable lubrication by micro-atomisation of straight oil, preferably at low pressure.

However, once again other solutions could be considered, for example such as deposition of solid oil drops.

Finally, as already mentioned, note that in the drilling process according to this invention, the airflow scavenging operation is preferably stopped before a new elementary drilling operation is started.

Other advantages and characteristics of the invention will become clear from the detailed non-limitative description given below.

BRIEF DESCRIPTION OF THE DRAWINGS

This description will be made with reference to the attached drawings among which.

DETAILED DESCRIPTION OF PREFERED EMBODIMENTS

Figure 1:
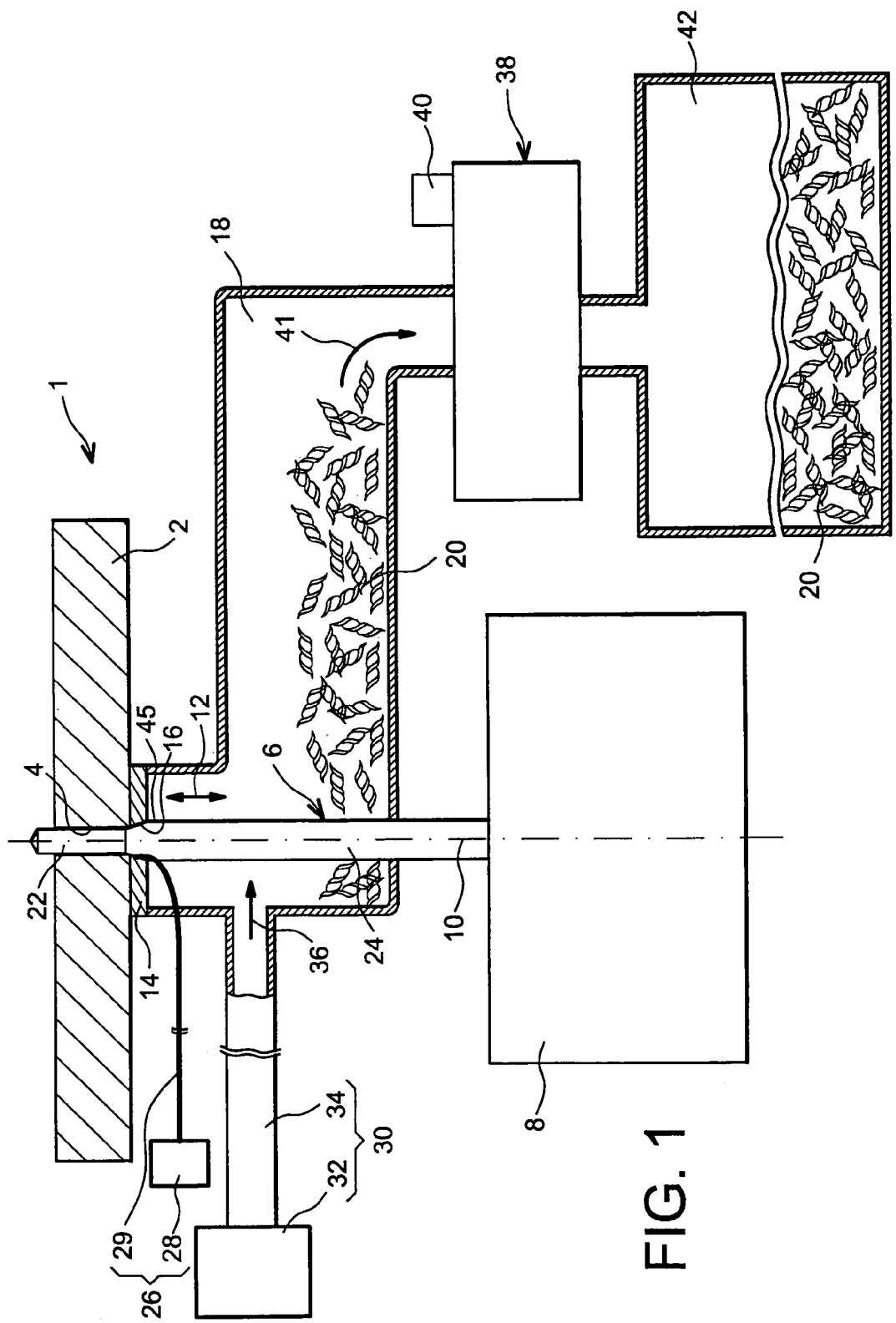
FIG. 1 shows a partially diagrammatic sectional view of a drilling device according to a preferred embodiment of this invention.

FIG. 1 shows a drilling device 1 according to a preferred embodiment of this invention, this automated or semi-automated type device 1 being shown in a position occupied at the end of an elementary drilling operation. In this respect, it is globally agreed that an elementary drilling operation begins when a rotating tool 6 in the device 1 is started in rotation, even if it is not yet in contact with a part 2 to be drilled, and the operation terminates when the required hole 4 is produced, and the tool 6 is still inside the hole.

The drilling device 1, comprises a known type of drilling machine 8, on which a rotating tool 6 in the form of a drill bit is mounted. Therefore, this drilling machine 8 is capable of rotating the drill bit 6 about its own axis 10, and displacing it in a direction 12 parallel to this axis 10, as shown diagrammatically by the double arrow in FIG. 1.

The device 1 comprises a bearing nose 14 that will come into contact with the part 2 to be drilled, this bearing nose 14 being provided with an opening 16 to allow the drill bit 6 to pass when drilling, and designed so as to achieve a sealed contact with the part 2 when it comes into contact with it, as shown in FIG. 1.

In the preferred embodiment shown, the bearing nose 14 participates in delimitation of an intermediate storage chamber 18 for chips 20, that is located below this nose 14.

As can be seen in FIG. 1, during drilling of the hole 4, the drill bit 6 passes through the intermediate chamber 18 so as to project upwards from it with a fluted part 22, and downwards with a central part 24 of the drill bit 6.

If the intermediate chamber 18 extends below the nose 14 and therefore along the drill bit 6, it should be noted that this chamber 18 preferably extends along a plane orthogonal to the axis 10 of the drill bit 6, as can be seen in FIG. 1. In other words, the height of the intermediate storage chamber 18 along a direction associated with the axis 10 is small compared with a length along a direction parallel to the plane orthogonal to this axis 10.

Lubrication means 26 are arranged so as to be able to lubricate the drill bit 6. For example, these means 26 are in the form of a lubricant reservoir 28 connected to a pipe 29 passing through a wall of the intermediate storage chamber 18, so as to come as close as possible to the drill bit 6.

It is then possible to lubricate by micro-atomisation of straight oil at low pressure, the pressure used actually being between 3 and 6 bars.

Furthermore, the device 1 comprises blowing means 30 close to the bearing nose 14, preferably comprising a compressed air supply 32 connected to the intermediate chamber 18 through a pipe 34. In this respect, as shown diagrammatically by the arrow 36, the pipe 34 is arranged such that the airflow introduced into the intermediate chamber 18 is approximately parallel to the plane orthogonal to the axis 10.

Furthermore, blowing is done at a relatively low pressure, less than or equal to 8 bars, from an available compressed air network. It should be noted that the blowing means 30 do not in any way participate in introducing chips 20 into the intermediate chamber 18, since in any case they are not used during the elementary drilling operation.

Suction means 38 are connected to the bottom of the intermediate storage chamber 18 and are in the form of a Venturi effect suction system coupled to a pneumatic sequencing solenoid valve 40, designed to enable sequential suction of the chips 20.

The suction system 38 is capable of generating a strong airflow inside the intermediate chamber 18 as shown diagrammatically by the arrow 41. This airflow, with a value adapted to the nature of the drilled material, creates a driving force in the chamber with the objective of evacuating the chips 20 present in the chamber 18 towards a main storage chamber 41 also connected to the suction system 38. For information, the value of the airflow generated by the suction system 38 may be between 120 and 180 m/s.

This scavenging of chips 20 towards the main chamber 42 by an airflow is preferably also done using blowing means 30, the means 30 and 38 then jointly forming airflow scavenging means.

It should be noted that if the Venturi effect suction system 38 and the main storage chamber 42 have been presented as forming two distinct entities, it is naturally possible for them to form a single assembly, which would then also be capable of performing a filtration function for elements transiting between chambers 18 and 42.

For example, the main storage chamber 42 has a volume approximately fifty times larger or more than the volume of the intermediate chamber 18.

Figure 2:
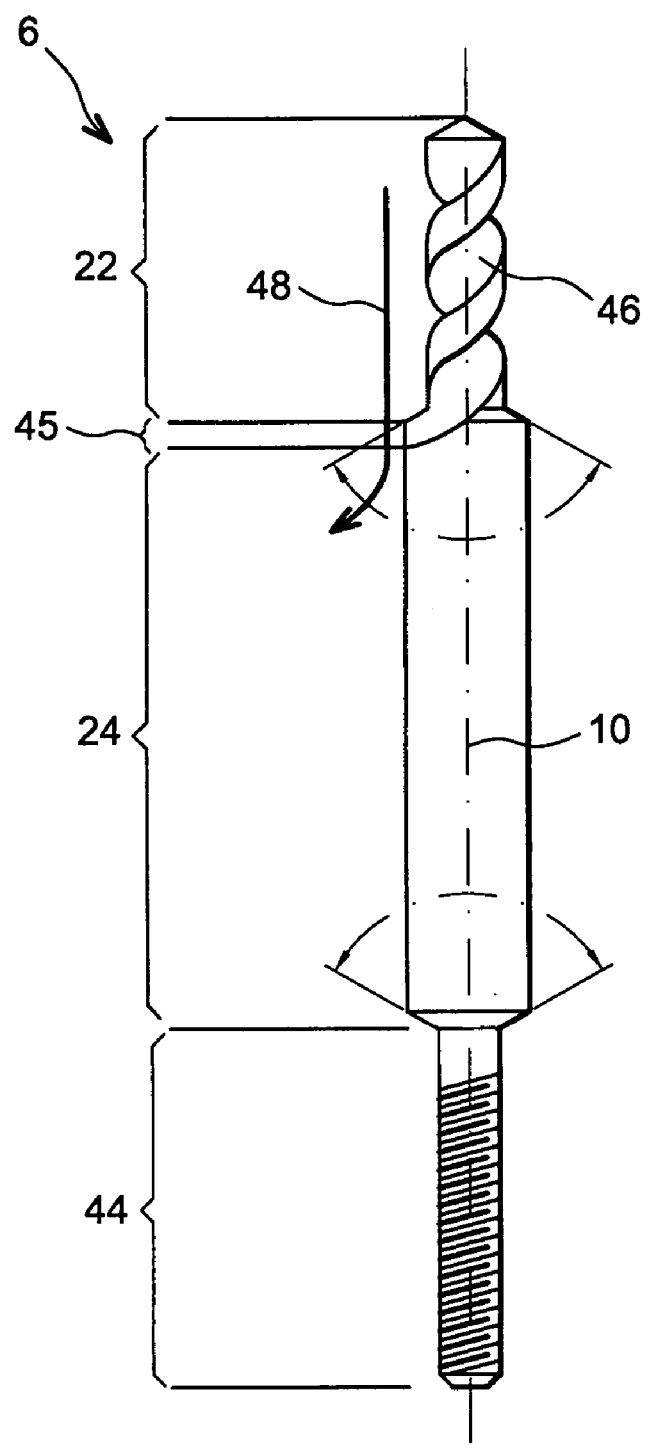
FIG. 2 shows an enlarged front view of the rotating tool belonging to the drilling device shown in FIG. 1.

With reference to FIG. 2, the Figure shows a more detailed view of the drill bit 6 in FIG. 1.

This drill bit 6 actually includes a cutting part and a fluted part 22, this part 22 being connected to a central part 24 acting as an extension and that is prolonged by a threaded part 44 used for assembly of the drill bit 6 on the drilling machine 8. Furthermore, as shown, the parts 22 and 24 are rigidly connected to each other by a junction area 45 including one end of the flutes 46, this junction area 45 beginning immediately after a tapered end portion belonging to the part 22, and therefore having a diameter approximately the same as the diameter of the central part 24, and consequently more than the diameter of the part 22 also called the diameter of the drill bit 6.

Therefore, the part 22 comprises one or several helical flutes 46, that are chosen to be deep and long, passing through the junction area 45, so as to procure an <<Archimedes screw>> type effect. In this respect, the depth of the flutes is of the order of 0.35 to 0.40 times the diameter of the part 22 of the drill bit, their length being sufficiently long so that the chips are removed far from the drilling area.

Thus, as shown diagrammatically by arrow 48, the chips produced during the elementary drilling operation gradually pass along the drill bit 6 in the flutes 46 towards the central part 24 and are then ejected from the flutes as soon as their top end arrives at the end of these flutes 46, in other words at the end of the junction area 45. The ejection can then be done at a given angle from the axis 10 of the drill bit 6, this angle for example being between 30 and 50°.

Since the junction area 45 of parts 22 and 24 of the drill bit 6 is located inside the intermediate storage chamber 18 throughout the chip production period that occurs during the elementary drilling operation, and more generally during any elementary operation, the chips 20 are then permanently and automatically ejected into this intermediate storage chamber 18 without any airflow being generated.

We will now present a drilling method according to a preferred embodiment of this invention, this method being done using the drilling device 1 that has been described.

Naturally, as mentioned above, it should be remembered that the method that will be presented below may be automated or semi-automated.

Firstly, it should be noted that before carrying out an elementary drilling operation, the bearing nose 14 is moved so as to create a sealed contact with the part 2 to be drilled, this contact obviously being made such that the drill bit 6 is facing the hole 4 to be drilled. At this moment, the drill bit 6 does not yet project from the nose 14 through the opening 16, and therefore its fluted part 22 is located inside the intermediate chamber 18. For guidance, it should be noted that the preliminary operation for displacement of the bearing nose 14 also causes displacement of all other elements of the device 1 that are fixed to this nose, such as the intermediate chamber 18, the main chamber 42, the scavenging means 30, 38, the drilling machine 8 and the drill bit 6.

The elementary drilling operation can then begin by rotating the drill bit 6 using the drilling machine 8. Starting rotation is then directly followed by displacement of the drill bit 6 along the direction 12 with respect to the intermediate chamber 18, which firstly brings this drill bit 6 into contact with the part 2 to be drilled.

This is the moment at which production of chips 20 starts, which due to the <<Archimedes screw>> type effect mentioned above, are automatically ejected into the intermediate storage chamber 18 after passing firstly through the opening 16 along the flutes 46, and then reaching a lower end of these flutes 46.

Therefore chips 20 accumulate in the intermediate chamber 18 after leaving the flutes 46, at the junction area 45.

Before the drill bit 6 is brought into contact with the part 2 to be drilled, a lubrication operation of this drill bit 6 is carried out simultaneously using lubrication means 26.

This lubrication operation is usually done before the drill bit 6 comes into an end of drilling movement position, corresponding to the position shown in FIG. 1. In this respect, it should be noted that this position marks creation of the hole 4 and the end of the elementary drilling operation.

It should be noted that the lack of airflow during the drilling operation obviously means that lubrication is in no way disturbed.

Thus, an airflow is made to scavenge the chips 20 that were stored in the intermediate chamber 18 after the elementary drilling operation is complete. Therefore this scavenging operation combines blowing means 30 and major suction means 28, suction being controlled by the solenoid valve 40.

Thus, the chips 20 are evacuated from the intermediate chamber 18 to enter into the main chamber 42, where they join other chips 20 produced during the previous elementary operations.

The next elementary operation will not begin until the above mentioned scavenging operation is complete, always with the objective of avoiding unwanted suction of injected lubricant.

Thus, the above description shows that the pneumatic solenoid valve 40 can achieve sequential suction of chips 20, for which the suction sequences take place only between two elementary drilling operations, and more generally during periods in which lubricant is not injected.

Obviously, various modifications could be made by those skilled in the art to the drilling device 1 and the drilling method that have just been described, simply as non-limitative examples. Thus, the drilling machine could carry several bits and therefore perform several elementary drilling operations simultaneously. Furthermore, although the device has been described as having a drill bit in which the fluted part is facing upwards, it would naturally be possible for the drill bit to be facing downwards or in any other required direction.

The invention claimed is:

1. A drilling method using a drilling device comprising a rotating tool and a drilling machine capable of turning the tool in rotation, and lubrication means capable of lubricating the rotating tool, said drilling device further comprising:
    an intermediate chamber for storage of chips produced during an elementary drilling operation;
    introduction means, for introducing said chips into the intermediate storage chamber during the elementary drilling operation, said introduction means being designed so as to operate other than by generating an airflow;
    a main chamber for storage of chips communicating with the intermediate storage chamber; and
    scavenging means capable of generating an airflow scavenging said chips,
    the drilling method comprising said elementary drilling operation performed using the rotating tool and the drilling machine, and a lubrication operation of the rotating tool performed using the lubrication means, said lubrication operation being performed during the elementary drilling operation,
    wherein said elementary drilling operation is performed using said introduction means, without activating said scavenging means, and said elementary drilling operation is followed by an airflow scavenging operation of the chips stored in said intermediate storage chamber via said introduction means during said elementary drilling operation, said scavenging operation being performed with said scavenging means such that the chips are scavenged from said intermediate storage chamber towards said main storage chamber.

2. A drilling method according to claim 1, wherein said introduction means are composed of an adapted shape of the rotating tool, which automatically drives the chips produced towards the intermediate storage chamber close to this tool.

3. A drilling method according to claim 2, wherein the rotating tool is provided with helical flutes so that an <<Archimedes screw>> type effect can be obtained.

4. A drilling method according to claim 3, wherein said rotating tool has a part with flutes and a central part fixed to the part, a junction area between the central part and the fluted part being located inside said intermediate storage chamber.

5. A drilling method according to claim 1, wherein said scavenging means comprise suction means and blowing means.

6. A drilling method according to claim 5, wherein said suction means are in the form of a Venturi effect suction system, said system communicating with said intermediate chamber for storage of chips.

7. A drilling method according to claim 6, wherein said Venturi effect suction system integrates said main chamber for storage of chips.

8. A drilling method according to claim 5, wherein said suction means are coupled to a pneumatic solenoid valve for producing a sequential suction.

9. A drilling method according to claim 5, wherein said blowing means are in the form of a compressed air supply communicating with said intermediate chamber for storage of chips.

10. A drilling method according to claim 1, wherein said lubrication means are designed so as to enable lubrication by micro-atomisation of straight oil.

* * * * *